United States Patent
Ito

(10) Patent No.: US 7,523,407 B2
(45) Date of Patent: Apr. 21, 2009

(54) INFORMATION PROCESSING APPARATUS, COMPUTER-READABLE COMPUTER PROGRAM, AND DEVICE SETUP SYSTEM

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 380 days.

(21) Appl. No.: 11/103,441

(22) Filed: Apr. 12, 2005

(65) Prior Publication Data

US 2005/0223332 A1 Oct. 6, 2005

(30) Foreign Application Priority Data

Mar. 31, 2004 (JP) ............... 2004-106027

(51) Int. Cl.
G06F 13/00 (2006.01)
G06F 15/00 (2006.01)

(52) U.S. Cl. .................... 715/771; 715/773

(58) Field of Classification Search ......... 715/771–773, 715/777, 810, 838–843, 965; 345/151, 156
See application file for complete search history.

(56) References Cited

U.S. PATENT DOCUMENTS

| 6,507,351 B1 * | 1/2003 | Bixler ................... 715/810 |
| 6,614,550 B1 | 9/2003 | Minagawa |
| 2004/0032400 A1 * | 2/2004 | Freeman et al. ......... 345/173 |
| 2004/0075754 A1 * | 4/2004 | Nakajima et al. ....... 348/231.6 |

FOREIGN PATENT DOCUMENTS

| JP | 2001-75787 | 3/2001 |
| JP | 2001-188672 | 7/2001 |
| JP | 2002-330249 A | 11/2002 |
| JP | 2003-15843 | 1/2003 |
| JP | 2002-216380 | 7/2003 |
| JP | 2003-348272 | 12/2003 |
| JP | 2003-348273 | 12/2003 |

OTHER PUBLICATIONS

Japanese Office Action in Application No. 2004-106027.

* cited by examiner

Primary Examiner—Kevin Nguyen
(74) Attorney, Agent, or Firm—Banner & Witcoff, Ltd

(57) ABSTRACT

An information processing apparatus for being connected to an external electronic device to communicate with the electronic device, the apparatus including a display device including a screen; a display controller which selectively controls, in each one of a plurality of setup-image display control modes, the display device to selectively display a corresponding one of a plurality of setup images respectively used to input, to the apparatus, a plurality of batches of setup information to set up the electronic device; and a mode selector which is started by any one of a plurality of external causes, selects a corresponding one of the setup-image display control modes, and causes the display controller to control, in the selected setup-image display control mode, the display device to display a corresponding one of the setup images that is used to input a corresponding one batch of setup information of the plurality of batches of setup information.

20 Claims, 7 Drawing Sheets

INFORMATION PROCESSING APPARATUS, COMPUTER-READABLE COMPUTER PROGRAM, AND DEVICE SETUP SYSTEM

The present application is based on Japanese Patent Application No. 2004-106027 filed on Mar. 31, 2004, the contents of which are incorporated herein by reference.

BACKGROUND OF THE INVENTION

1. Field of the Invention

The present invention relates to an information processing apparatus, a computer-readable computer program, and a device setup system.

2. Discussion of Related Art

As an external electronic device that can be set up by a remote operation of an information processing device such as a personal computer (PC), there is known, e.g., a facsimile machine having a quick-dial function. For example, the facsimile machine and the PC are disclosed by Japanese Patent Application Publication No. 2003-216380.

When the quick-dial function of the facsimile machine is used, it is needed beforehand to register, in a telephone directory (e.g., a memory) provided in the facsimile machine, respective telephone numbers of destinations (e.g., persons and/or companies) to which facsimile data are transmitted, and respective names of those destinations, such that the telephone numbers and the names are associated with respective quick-dial numbers, i.e., respective abbreviated telephone numbers. However, generally, the facsimile machine cannot employ a display device (e.g., a liquid crystal display) large enough to display the telephone directory, because the employment of the display device leads to increasing the production cost and the overall size. In addition, the facsimile machine cannot employ an operation panel having a sufficiently large number of input keys, and accordingly two or more characters are allocated to each one of the input keys. In the latter case, it is cumbersome to input characters into the facsimile machine. To avoid this problem, it has been practiced to configure the telephone directory (i.e., memory) of the facsimile machine such that the telephone directory can be set up or prepared by a remote operation of an information processing device such as a PC, so that a user can more easily register, through the PC, the telephone numbers, the names, etc. in the telephone directory of the facsimile machine.

Recently, digital multifunctional (MF) devices have been widely used. Each MF device has, in addition to the facsimile function, a copier function, a scanner function, and/or a PC-FAX function wherein a data file that is dealt with by a PC can be directly transmitted as facsimile data. Since the MF device has the many functions, it is needed to store, as a plurality of bathes of setup information, a plurality of batches of control information (e.g., control parameters) used to control each one of the functions. Thus, many digital MF devices are adapted such that respective batches of control information used to control their functions are set up or inputted by a remote operation of an information processing device.

When a digital MF device is set up by a remote operation of an information processing device, it is generally practiced to display, on a display device of the information processing device, a device setting image functioning as a graphical user interface (GUI). As the device setting image functioning as GUI, there is known a tab-using device setting image that includes a first display area for displaying a list of tabs, and a second display area for displaying a tab sheet (i.e., a dialog) corresponding to one of the tabs that is selected using, e.g., a pointing device. Thus, the tab-using device setting image can indicate each one of many dialogs in a comparatively narrow display area of the display device.

In addition, there is known another GUI including a first display area for displaying a list of symbols (e.g., icons) corresponding to respective dialogs that can be displayed, and a second display area for displaying one of the dialogs that corresponds to one of the symbols that is selected with, e.g., a pointing device. In this GUI, the list of symbols are displayed, like a tree, in the first display area and, when one of the symbols is clicked or selected using the pointing device, one dialog corresponding to the selected symbol is displayed in the second display area.

SUMMARY OF THE INVENTION

However, the above-indicated tab-using device setting image as GUI that is used to display selectively each one of the plurality of dialogs, suffers a problem that when the device setting image is initially displayed on the display device, one of the dialogs that may not be desired by a user is automatically displayed, as a "default" dialog, in the second display area of the device setting image. More specifically explained, since the default dialog is one of the plurality of dialogs, it may not be one desired by the user. Thus, if the user wants to display the desired dialog in the second display area, after the device setting image is initially displayed on the display device, the user needs to click, with the pointing device, the tab corresponding to the desired dialog, in the first display area, so as to select and call the desired dialog into the second display area.

In the above-described technical background, the present invention has been developed. It is therefore an object of the present invention to provide an information processing apparatus which enables a user to easily call a desired device setting image used to set up an external electronic device; a computer-readable computer program that is employed by the information processing apparatus; and a device setup system including the information processing apparatus and the electronic device.

According to a first aspect of the present invention, there is provided an information processing apparatus for being connected to an external electronic device to communicate with the electronic device, the apparatus comprising: a display device including a screen; a display controller which selectively controls, in each one of a plurality of setup-image display control modes, the display device to selectively display a corresponding one of a plurality of setup images respectively used to input, to the apparatus, a plurality of batches of setup information to set up the electronic device; and a mode selector which is started by any one of a plurality of external causes, selects a corresponding one of the setup-image display control modes, and causes the display controller to control, in the selected setup-image display control mode, the display device to display a corresponding one of the setup images that is used to input a corresponding one batch of setup information of the plurality of batches of setup information.

For example, in the case where the present information processing apparatus is constituted by a computer that is operated by an operating system (OS) provided with a graphical user interface (GUI), the operation of the mode selector can be controlled by, e.g., the above-indicated operating system, or an application program usable on the operating system.

In the present information processing apparatus, the display controller can control the display device (e.g., a liquid crystal display) to selectively display each one of the different setup images corresponding to the different external causes each of which may be formed by an external-cause forming means (e.g., the above-indicated application program) and triggers or starts the operation of the mode selector. Therefore, the user can easily call, at the beginning, a desired setup image (e.g., a desired setup dialog), by just selecting one of the external causes formed by the external-cause forming means. Thus, unlike the conventional tab-using device setting image, each setup image displayed by the display device of the present information processing apparatus does not require the user to click, e.g., the tabs to change the setup images. Therefore, the present information processing apparatus enables the user to easily call the desired setup image on the screen of the display device.

When the user selects, through the mode selector, a desired one of the setup-image display control modes of the display controller, the display controller is started to control the display device to display a corresponding one of the setup images. Therefore, the setup image displayed by the display device of the present information processing apparatus does not require the user to change the setup images. Thus, the present information processing apparatus enables the user to easily call the desired setup image.

Each setup image displayed by the present information processing apparatus may be one that includes a first display area (hereinafter, referred to as the "symbol-list display area") for displaying a list of symbols designating respective setup images, and a second display area (hereinafter, referred to as the "setup-image display area") for displaying one of the setup images that corresponds to a selected one of the symbols. In this case, the display controller may be one that controls the display device to display, as an initial image, one of the setup images that corresponds to the selected setup-image display control mode.

According to a second aspect of the present invention, there is provided a device setup system, comprising an information processing apparatus according to the first aspect of the present invention; and an external electronic device to which the information processing apparatus is connected to communicate with the electronic device and thereby set up the electronic device.

The device setup system in accordance with the second aspect of the present invention enables a user to easily call a desired one of the setup images on the display device of the information processing apparatus.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
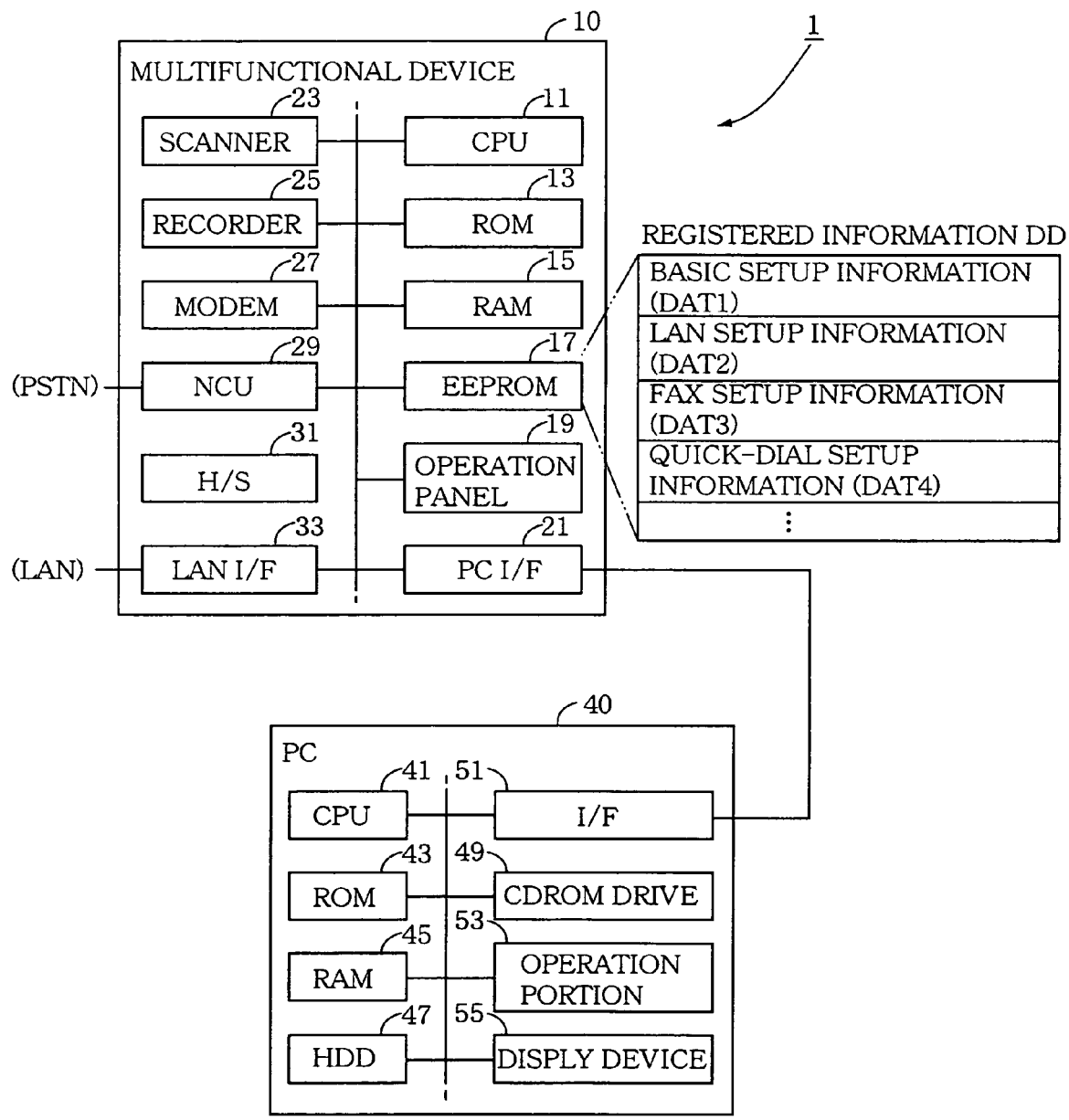
FIG. 1 is a diagrammatic view for explaining a construction of a device setup system 1 to which the present invention is applied.

Hereinafter, there will be described a preferred embodiment of the present invention by reference to the drawings. FIG. 1 is a view for explaining a construction of a device setup system 1 to which the present invention is applied. As shown in FIG. 1, the present device setup system 1 includes a digital multifunctional device (hereinafter, abbreviated to the "MF device") 10 as an external electronic device to be set up, and a personal computer (hereinafter, abbreviated to the "PC") 40 as an information processing apparatus that is connected to the MF device 10 such that the PC 40 can communicate with the MF device 10, and thereby set up the MF device 10.

Figure 9:
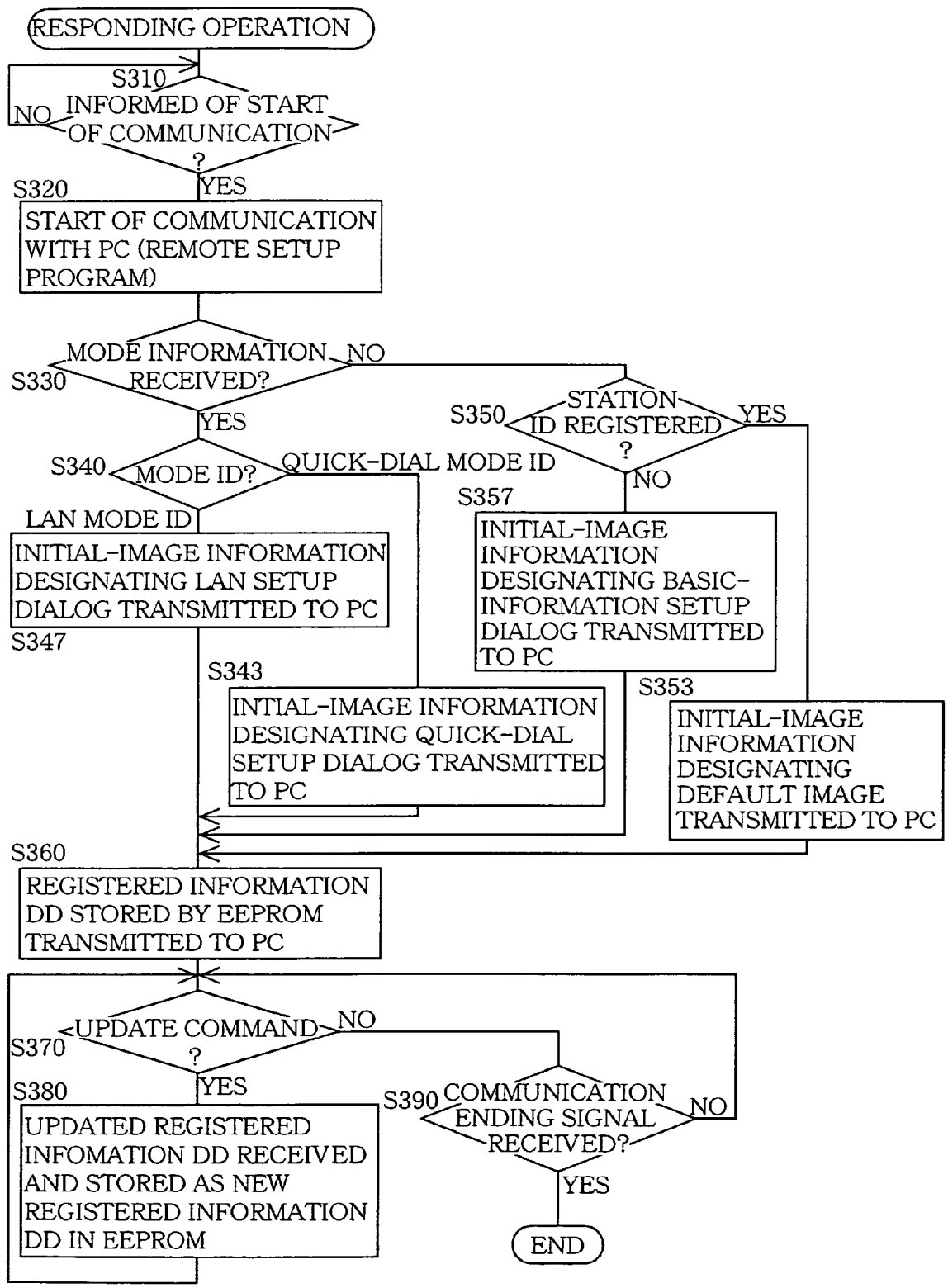
FIG. 9 is a flow chart representing a responding program according to which a CPU 11 of the MF device 10 carries out a responding operation.

The MF device 10 includes a CPU (central processing unit) 11 that controls the MF device 10 as a whole; a ROM (read only memory) 13 that stores various control programs including a program shown in FIG. 9; a RAM (random access memory) 15 that is used as a working area when the CPU 11 implements each of the control programs; an EEPROM (electrically erasable/programmable ROM) 17 that stores a plurality of batches of setup information; an operation panel 19 that includes a plurality of operation or input keys, not shown, that are operable by a user, and a liquid-crystal display, not shown; a PC interface (I/F) 21; a scanner 23; a recording device 25; a modem 27; a network control unit (NCU) 29 that is connected to a public telephone network (PSTN); a handset (H/S) 31; and a LAN interface (I/F) 33 that is connected to a LAN (local area network). The PC interface 21 may be a USB (universal serial bus) interface. The MF device 10 is connected via the PC interface 21 to the PC 40, such that the MF device 10 can communicate with the PC 40.

The CPU 11 implements the control programs stored in the ROM 3, in response to commands inputted through the operation panel 19, the PC 40, one or more terminals in LAN, etc. More specifically described, the CPU 11 implements the control programs stored in the ROM 3, for the purpose of controlling the scanner 23, the recording device 25, the modem 27, the NCU 29, and the LAN interface 33, and thereby operating a plurality of well-known functions, i.e., facsimile function, telephone (vocal communication) function, copying function, scanning function, and PC-FAX function.

Here, the PC-FAX function means the function of preparing, from a data file received via the PC interface 21, an electronic mail and transmitting the electronic mail to a communication terminal as a destination, and converting the data file into facsimile data and transmitting the facsimile data to a facsimile machine as another destination.

The EEPROM 17 stores registered information DD representing various parameters defining the functions of the MF device 10. More specifically described, the EEPROM 17 stores, as the registered information DD, a plurality of batches of setup information including basic setup information DAT1, LAN setup information DAT2, FAX setup information DAT3, quick-dial setup information DAT4, etc.

The basic setup information DAT1 represents one or more basic parameters that should be set up by the user prior to any other parameter of the MF device 10, e.g., a station ID (identification) of the MF device 10 that is essentially needed when the MF device 10 transmits facsimile data. The LAN setup information DAT2 is needed when the MF device 10 carries out data communications with one or more communication terminals in LAN or the Internet, according to, e.g., the TCP/IP protocol. The FAX setup information DAT3 represents various parameters needed to control the facsimile-data transmitting and receiving operations of the MF device 10. The quick-dial setup information DAT4 relates to a quick-dial function of the MF device 10, and provides so-called "a telephone directory". More specifically described, the quick-dial setup information DAT4 include telephone-number-related information that includes telephone-number information representing respective telephone numbers of destinations, ID information representing respective names of those destinations, and quick-dial-number information representing respective quick-dial numbers (i.e., respective abbreviated numbers) of those destinations. In the quick-dial setup information DAT4, the telephone numbers, the names, and the quick-dial numbers of the destinations are related to each other.

Figure 2:
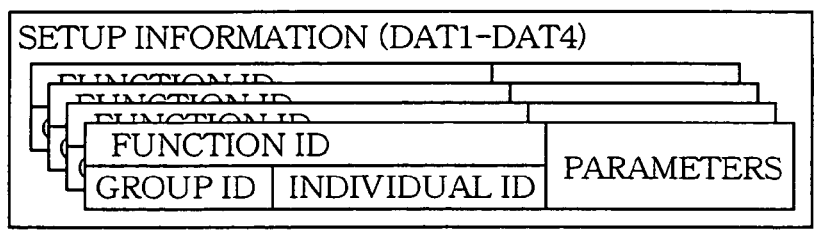
FIG. 2 is an illustrative view for explaining a plurality of batches of setup information DAT1 through DAT4 that are currently stored in an EEPROM 17 of a multifunctional (MF) device 10 of the system 1.

FIG. 2 is a view for explaining contents of each of the four batches of setup information DAT1 through DAT4 as the registered information DD. Each of the four batches of setup information DAT1 through DAT4 includes one or more parameters and a function identification (ID) given to the parameter or parameters. The function ID is constituted by a combination of a group ID and an individual ID. Each of the four batches of setup information DAT1 through DAT4 is given a corresponding one of different group IDs, and accordingly all the parameters are grouped into four groups, i.e., the four batches of setup information DAT1 through DAT4.

The scanner 23 includes an image sensor, not shown, and optically reads, with the image sensor, an image from an original. Thus, the scanner 23 produces image data representing the read image. The recording device 25 is for recording, on a recording sheet, an image based on the image data produced by the scanner 23, or facsimile data transmitted from a remote facsimile machine. The recording device 25 has a construction similar to a well-known ink-jet printer or a laser printer.

The modem 27 is a modulating and demodulating device that transmits and receives, via the NCU 29, facsimile data to and from a remote facsimile machine. The NCU 29 is for sending out a dial signal needed to call a remote communication terminal connected to the public telephone network (PSTN), and holding the telephone line. The handset 31 includes a microphone and a speaker, collects sounds (e.g., voices) of the user, sends out, via the NCU 29, sound signals representing the collected sounds to a remote telephone set, and reproduces sounds represented by sound signals received from the remote telephone set.

The LAN interface 33 is constructed such that the interface 33 is connectable via a local area network (LAN) to the Internet, and carries out data communications with a communication terminal in LAN or the Internet, in response to a command received from the CPU 11.

Figure 4:
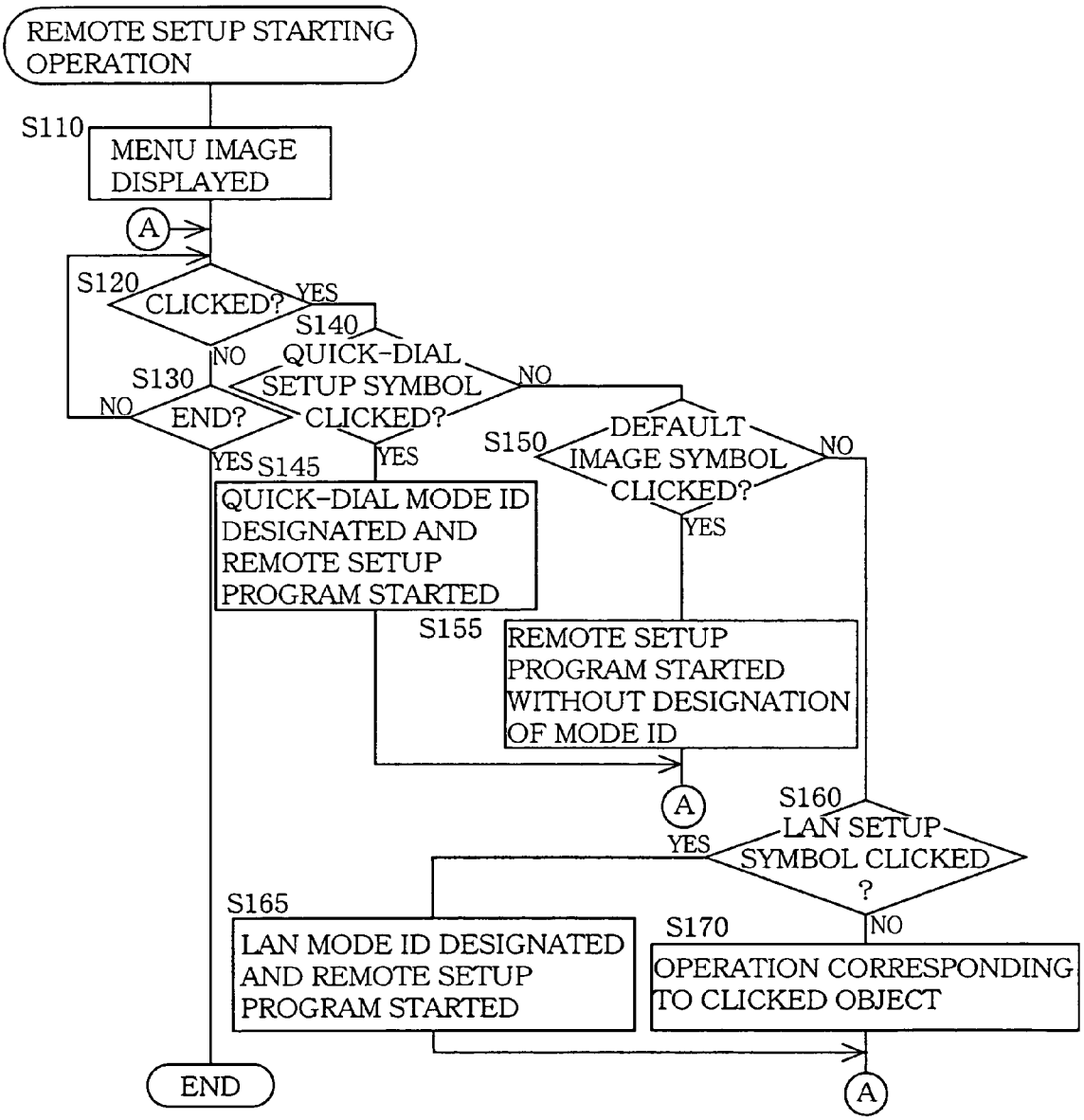
FIG. 4 is a flow chart representing the application program Pr1, i.e., a remote setup starting operation.
Figure 5:
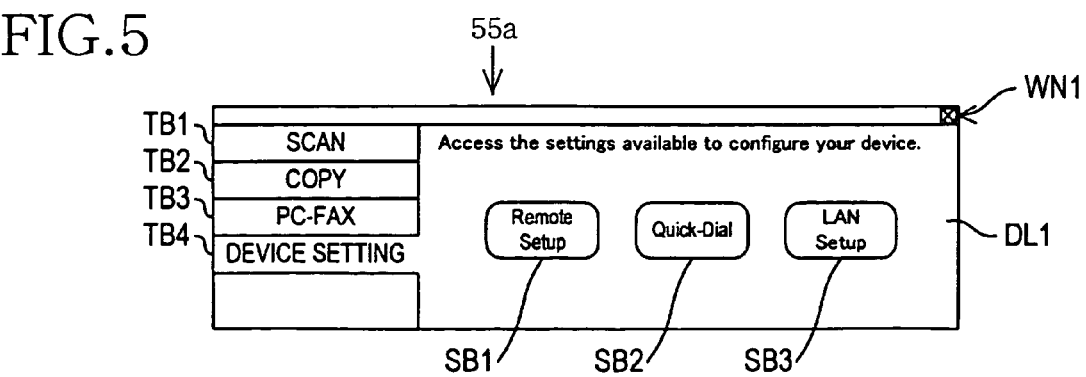
FIG. 5 is a view for explaining a menu image WN1 including a device setting dialog DL1 as a first mode-select image.
Figure 6:
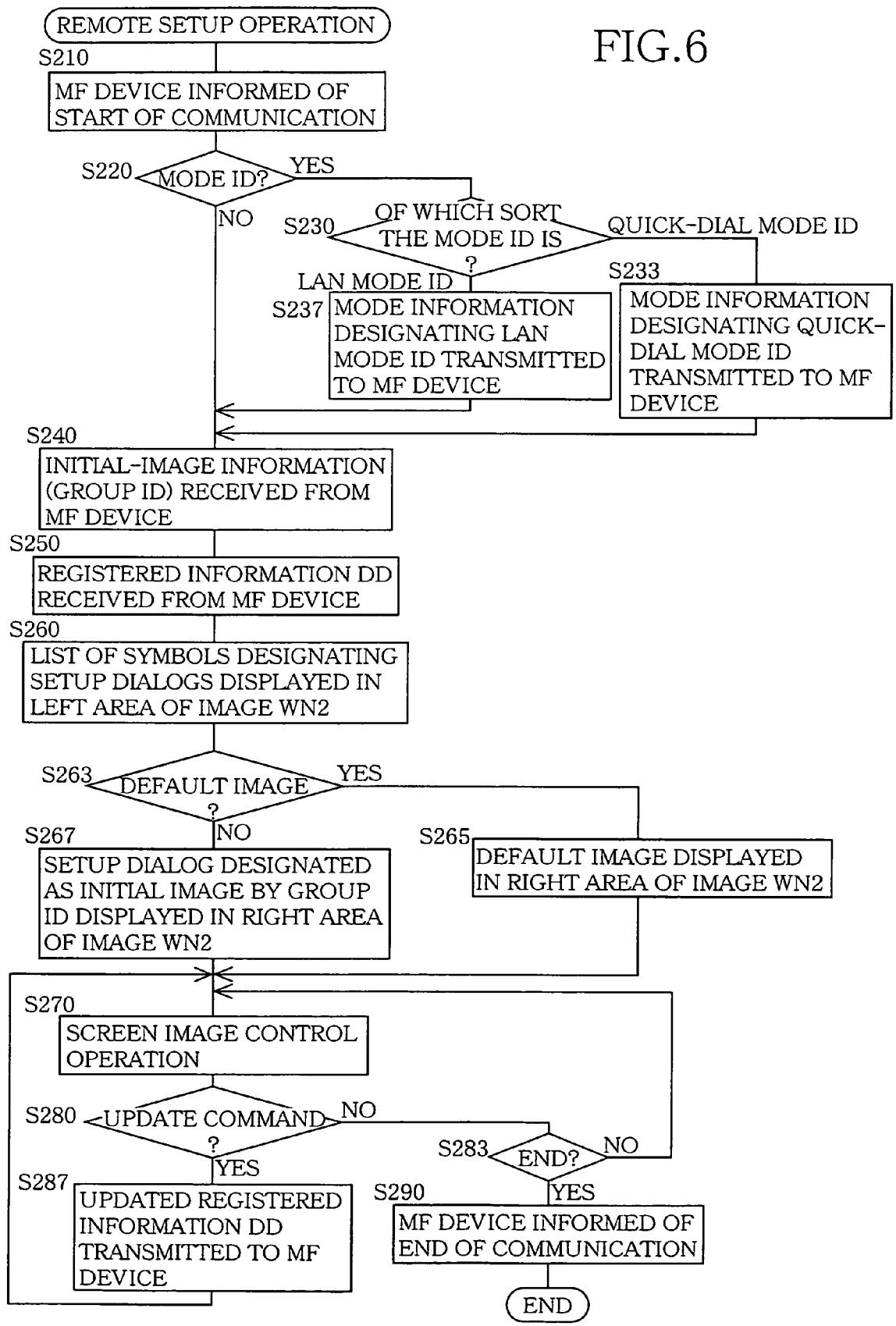
FIG. 6 is a flow chart representing the remote setup program Pr2, i.e., a remote setup operation.

Meanwhile, the PC 40 includes a CPU 41 that carries out various calculations; a ROM 43 that stores control programs including programs shown in FIGS. 4 and 6; a RAM 45 that is used as a working area when the CPU 41 implements each of the control programs; a hard disc drive (HDD) 47; a CDROM drive 49; an interface (I/F) 51 connected to the PC interface 21 of the MF device 10 via a connection cable; an operation portion 53 as an input device that includes a keyboard and a pointing device; and a display device 55 including a liquid-crystal screen 55a (FIG. 5). The interface 51 may be a USB interface, and the PC 40 is connected via the interface 51 to the MF device 10 such that the PC 40 can communicate with the device 10.

The PC 40 is operated by an operating system (e.g., Windows®) provided with a graphical user interface (GUI), and implements a plurality of application programs on the operating system.

The hard disc drive 47 stores, e.g., an application program Pr1 for remote control of the MF device 10, and a remote setup program Pr2 for transmitting a plurality of batches of setup information DAT1 through DAT4 to the MF device 10. In response to a command inputted through the operation portion 53, the CPU 41 implements the application program Pr1 and/or the remote setup program Pr2, and carries out various operations according to the same Pr1, Pr2.

The application program Pr1 is a control program for controlling a remote setup starting operation, more specifically described, controlling the display device 55 to display a menu image WN1 shown in FIG. 5. The remote setup program Pr2 is for obtaining the current registered information DD from the MF device 10, and controlling the display device 55 to display, in a list display (left-hand) area R1 of a device setting image WN2 (FIGS. 7A, 7B, 8A, and 8B), a list of a plurality of symbols designating respective setup dialogs, like a tree, and display, in a dialog display (right-hand) area R2 of the device setting image WN2, a selected one of the setup dialogs.

Figure 3A:
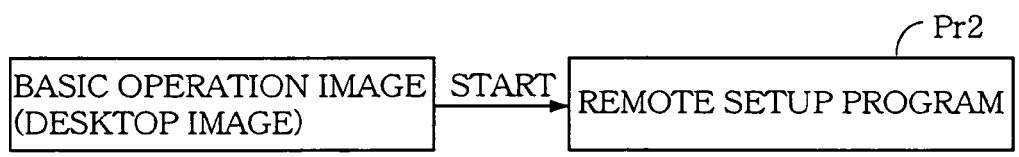
FIG. 3A is an illustrative view for explaining a manner of directly starting a remote setup program Pr2.
Figure 3B:
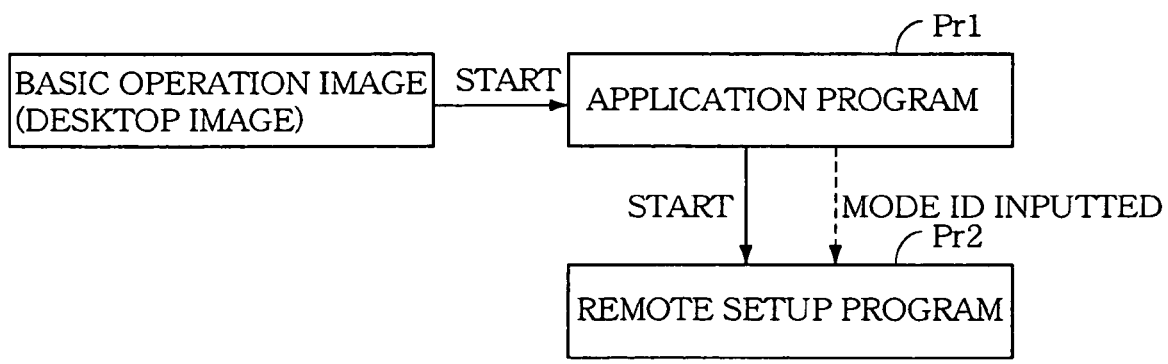
FIG. 3B is an illustrative view for explaining a manner of indirectly starting the remote setup program Pr2 via an application program Pr1.

FIGS. 3A and 3B are views for explaining respective manners of starting the remote setup program Pr2 and/or the application program Pr1 on the PC 40. In the present embodiment, there are two ways of starting the remote setup program Pr2 on the PC 40.

More specifically explained, the remote setup program Pr2 can be started by being called or clicked on a basic operation image as a GUI image (hereinafter, referred to as the "desktop image") that is displayed by the display device 55 under the control of the operating system, or alternatively by being called by the application program Pr1. When the application program Pr1 starts the remote setup program Pr2, the application program Pr1 can input, as an argument, a mode ID designating a setup-image display control mode, as needed, to the remote setup program Pr2. In the case where a mode ID is inputted as an argument, the remote setup program Pr2 operates in the setup-image display control mode designated by the mode ID.

FIG. 3A is a view for explaining a manner of starting the remote setup program Pr2 by selecting or clicking, with the pointing device, a symbol (so-called "icon") that is displayed in the desktop image and represents the program Pr2; and FIG. 3B is a manner of starting the remote setup program Pr2 by first clicking, with the pointing device, a symbol ("icon") displayed in the desktop image and representing the application program Pr1, and thereby starting the application program Pr1, and again operating the pointing device to call the remote setup program Pr2 under control of the application program Pr1.

FIG. 4 is a flow chart representing the application program Pr1 according to which the CPU 41 carries out the remote setup starting operation. First, at Step S110, the CPU 41 controls the display device 55 to display, as shown in FIG. 5, the menu image WN1 as a first mode-select image.

The menu image WN1 includes, in a left-hand area thereof, a SCAN tab TB1, a COPY tab TB2, a PC-FAX tab TB3, and a DEVICE SETTING tab TB4, like a tree. The SCAN tab TB1 is for displaying, in a right-hand area of the menu image WN1, a dialog to use, by remote control, the scanning function of the MF device 10; the COPY tab TB2 is for displaying, in the right-hand area of the image WN1, a dialog to use, by remote control, the copying function of the MF device 10; the PC-FAX tab TB3 is for displaying, in the right-hand area of the image WN1, a dialog to use, by remote control, the PC-FAX function of the MF device 10; and the DEVICE SETTING tab TB4 is for displaying, in the right-hand area of the image WN1, a device setting dialog DL1 to start the application program Pr1. When each one of the tabs TB1 through TB4 displayed in the left-hand area of the menu image WN1 is clicked or selected with the pointing device, a corresponding one of the dialogs is displayed in the right-hand area of the image WN1.

FIG. 5 shows, in the right-hand area of the menu image WN1, the device setting dialog DL1 corresponding to the DEVICE SETTING tab TB4 displayed in the left-hand area of the image WN1. The device setting dialog DL1 includes a remote setup program starting symbol SB1 to start the remote setup program Pr2 while designating, as an initial image, a default (blank) image R1, DF, shown in FIG. 7A, as a second mode-select image; a quick-dial mode starting symbol SB2 to start the remote setup program Pr2 while designating, as the initial image, a quick-dial setup dialog or image DL2 shown in FIG. 7B; and a LAN mode starting symbol SB3 to start the remote setup program Pr2 while designating, as the initial image, a LAN setup dialog or image DL3 shown in FIG. 8A.

Step S110 is followed by Step S120 where the CPU 41 judges whether any one of the symbols displayed in the right-hand area of the menu image WN1, i.e., the symbols SB1, SB2, SB3 displayed in the device setting dialog DL1 shown in FIG. 5), or any one of the tabs TB1 through TB4 displayed in the left-hand area of the image WN1 has been clicked or selected with the pointing device. If a negative judgment (NO) is made at Step S120, the control of the CPU 41 goes to Step S130 to judge whether a command to end or cancel the menu image WN1 has been inputted through the operation portion 53. If a negative judgment is made at Step S130, the CPU 41 waits for a positive judgment (YES) to be made at Step S120. Meanwhile, if a positive judgment is made at Step S130, the CPU 41 ends the current remote setup starting operation.

Meanwhile, if a positive judgment is made at Step S120, the control of the CPU 41 goes to Step S140 to judge whether the quick-dial mode starting symbol SB2 has been clicked. If a positive judgment is made at Step S140, the control of the CPU 41 goes to Step S145 to designate, as an argument, a mode ID designating a quick-dial setup-image display control mode (hereinafter, referred to as the "quick-dial mode ID"), and start the remote setup program Pr2. Step S145 is followed by Step S120.

On the other hand, if a negative judgment is made at Step S140, the control of the CPU 41 goes to Step S150 to judge whether the remote-setup program starting symbol SB1 has been clicked. If a positive judgment is made at Step S150, the control of the CPU 41 goes to Step S155 to start the remote setup program Pr2 without designating, as the argument, any mode IDs. Step S155 is followed by Step S120.

On the other hand, if a negative judgment is made at Step S150, the control of the CPU 41 goes to Step S160 to judge whether the LAN mode starting symbol SB3 has been clicked. If a positive judgment is made at Step S160, the control of the CPU 41 goes to Step S165 to designate, as the argument, a mode ID designating a LAN setup-image display control mode (hereinafter, referred to as the "LAN mode ID"), and start the remote setup program Pr2.

On the other hand, if a negative judgment is made at Step S160, the control of the CPU 41 goes to Step S170 to carry out an operation corresponding to the symbol or tab that has been clicked. For example, in the case where any one of the tabs TB1 through TB4 has been clicked, the CPU 41 controls the display device 55 to display the dialog corresponding to the clicked tab, in the right-hand area of the menu image WN1. Step S165 or Step S170 is followed by Step S120.

FIG. 6 is a flow chart representing the remote setup program Pr2 according to which the CPU 41 carries out the remote setup operation. The remote setup operation is started when the remote setup program Pr2 is started at each of Steps S145, S155, S165, or when the remote setup program Pr2 is started with the pointing device on the desktop image.

In the remote setup operation, first, at Step S210, the CPU 41 sends out, to the MF device 10, a communication starting signal to start communication between the PC 40 and the MF device 10. Step S210 is followed by Step S220 to judge whether a mode ID has been designated as the argument. If a positive judgment is made at Step S220, the control of the CPU 41 goes to Step S230 to identify of which sort the mode ID designated as the argument is. When the CPU 41 identifies the designated mode ID as the quick-dial mode ID, the control of the CPU 41 goes to Step S233 to transmit, via the interface 51, mode information indicating the quick-dial mode ID, to the MF device 10. On the other hand, when the CPU 41 identifies the designated mode ID as the LAN mode ID, the control of the CPU 41 goes to Step S237 to transmit, via the interface 51, mode information indicating the LAN mode ID, to the MF device 10.

After Step S233 or Step S237 is implemented, or when a negative judgment is made at Step S220, the control of the CPU 41 goes to Step S240 to obtain, from the MF device 10, initial-image information indicating an initial-image ID designating an initial image to be displayed in the dialog display (right-hand) area R2 of the device setting image WN2 (FIGS. 7A, 7B, 8A, and 8B). In the present embodiment, usually, the initial-image information obtained from the MF device 10 indicates, as the initial-image ID, an arbitrary one of the group IDs present in the registered information DD of the MF device 10. The reason why each group ID is used as the initial-image ID is such that the remote setup program Pr2 employed in the present embodiment is configured such that all the parameters corresponding to each group ID are displayed altogether in one setup dialog or image DL2, DL3.

Step S240 is followed by Step S250 where the CPU 41 receives, from the MF device 10, the registered information DD currently stored in the EEPROM 17, and then by Step S260 where the CPU 41 controls the display device 55 to display, in the list display (left-hand) area R1 of the device setting image WN2, the tree-like list of symbols designating the respective setup dialogs or images each of which can be displayed in the dialog display area R2 of the image WN2. Step S260 is followed by Step S263 where the CPU 41 judges whether the initial-image ID indicated by the initial-image information is not any of the group IDs corresponding to the setup dialogs but a default-image ID designating the default (blank) image DF shown in FIG. 7A. If a positive judgment is made at Step S263, the control of the CPU 41 goes to Step S265 to control the display device 55 to display the default image DF in the right-hand (dialog display) area R2 of the device setting image WN2, and thereby completes the image WN2.

On the other hand, if a negative judgment is made at Step S263, i.e., if the initial-image ID indicated by the initial-image information is one of the group IDs, the control of the CPU 41 goes to Step S267 to control the display device 55 to display, in the right-hand (dialog display) area R2 of the device setting image WN2, one of the setup dialogs that is designated by the one group ID as the initial-image ID indicated by the initial-image information, and thereby completes the image WN2.

Figure 7A:
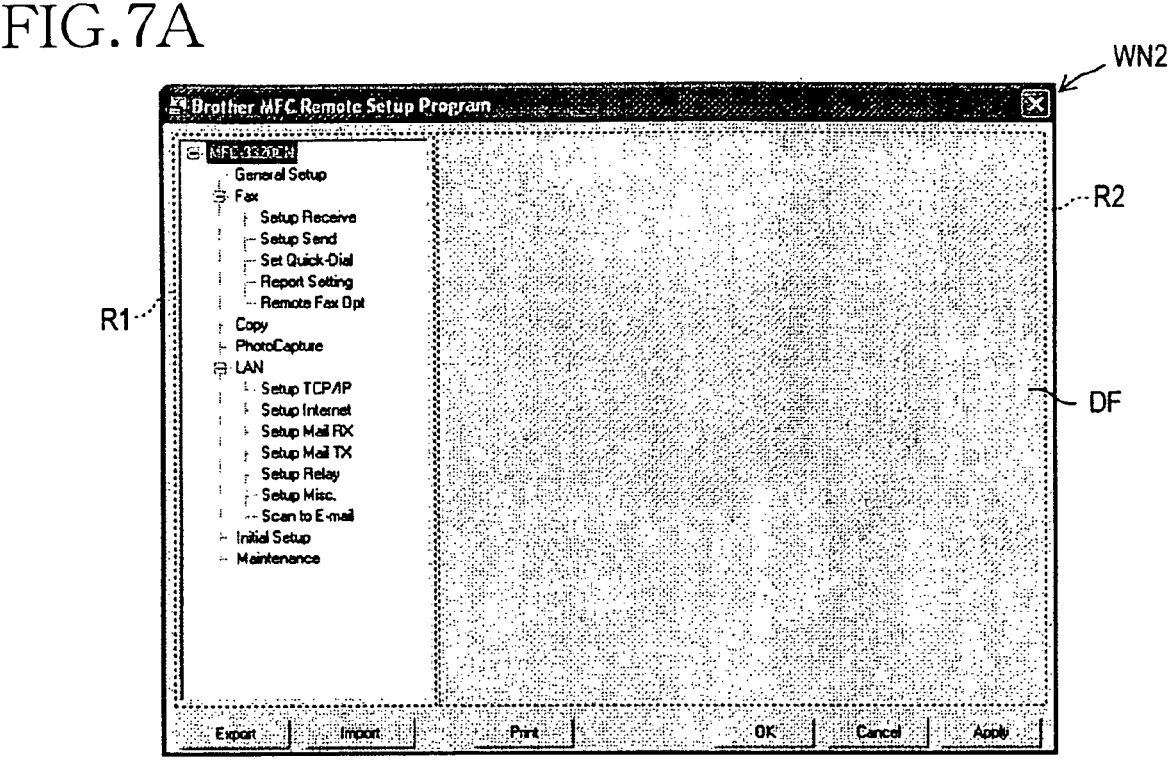
FIG. 7A is a view for explaining a device setting image WN2 (including a default or blank image DF as an initial image) as a second mode-select image.
Figure 7B:
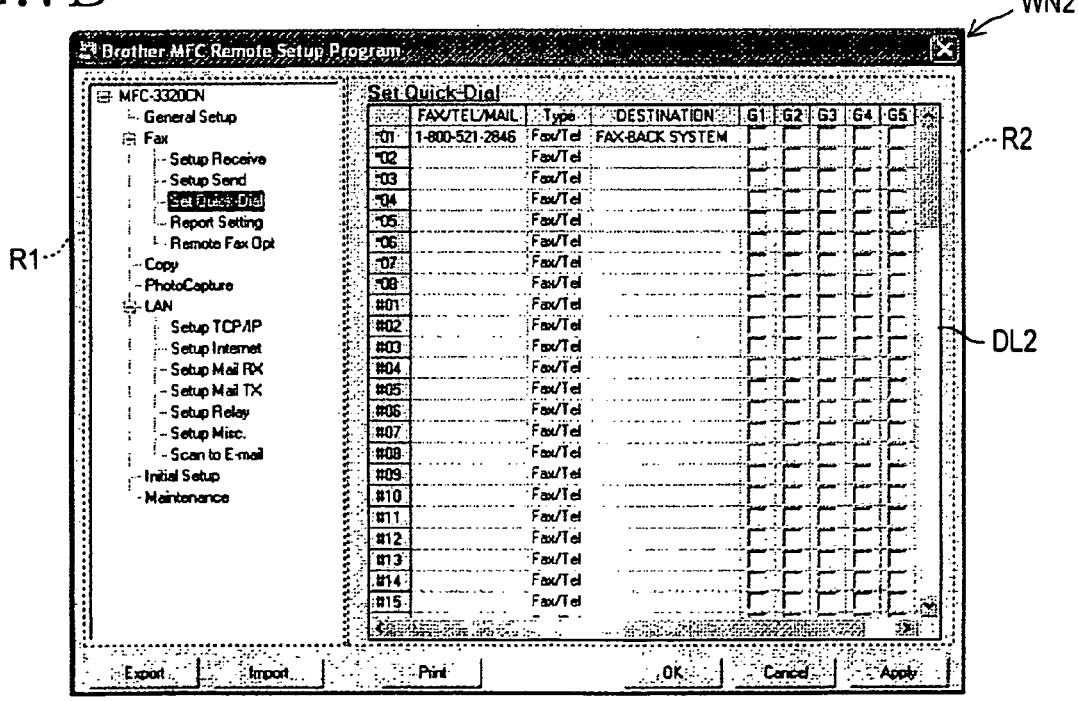
FIG. 7B is a view for explaining the device setting image WN2 including a quick-dial setup dialog as the initial image.

For example, in the case where the initial-image ID indicated by the initial-image information is the group ID designating the quick-dial setup information DAT4, the CPU 41 controls the display device 55 to display, in the dialog display area R2 of the device setting image WN2, the setup dialog DL2, shown in FIG. 7B, that represents the telephone directory in which the telephone numbers, the names, the quick-dial numbers, etc. can be registered, and thereby completes the image WN2.

Figure 8A:
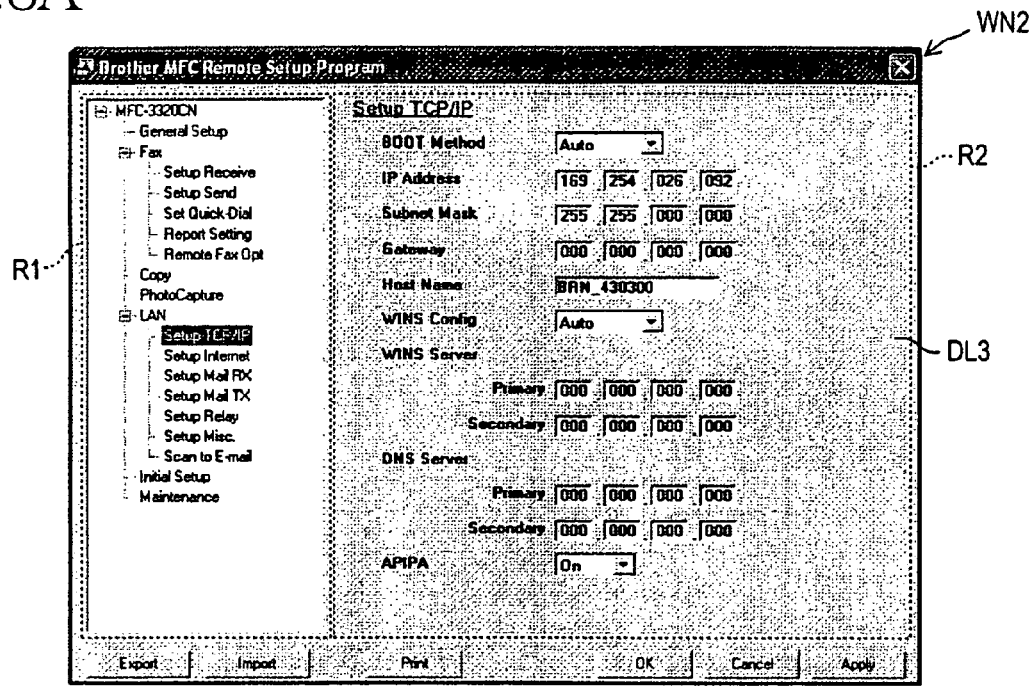
FIG. 8A is a view for explaining the device setting image WN2 including a LAN setup dialog as the initial image.

Alternatively, in the case where the initial-image ID indicated by the initial-image information is the group ID designating the LAN setup information DAT2, the CPU 41 controls the display device 55 to display, in the dialog display area R2, the setup dialog DL3, shown in FIG. 8A, that represents setup items concerning the TCP/IP protocol, and thereby completes the image WN2.

Figure 8B:
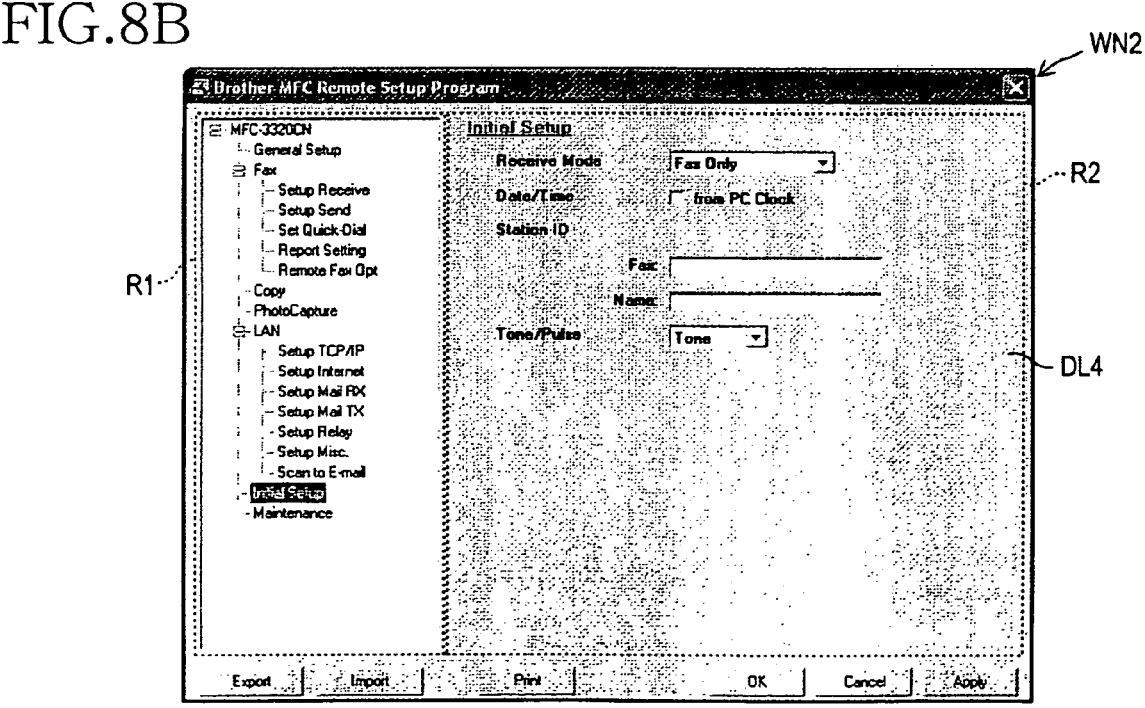
FIG. 8B is a view for explaining the device setting image WN2 including a basic-information setup dialog as the initial image.

Otherwise, in the case where the initial-image ID indicated by the initial-image information is the group ID designating the basic setup information DAT1, the CPU 41 controls the display device 55 to display, in the dialog display area R2, the setup dialog DL4, shown in FIG. 8B, that represents basic setup items including a station-ID inputting form, and thereby completes the image WN2. When the CPU 41 of the PC 40 receives, at Step S250, the registered information DD from the MF device 10, the CPU 41 additionally receives, from the MF device 10, a plurality of batches of setup-image constituting information as a plurality of batches of setup-image-related information that are needed by the CPU 41 to control the display device 55 to display the plurality of device setting images WN2, shown in FIGS. 7B, 8A, and 8B, respectively. Each batch of setup-image constituting information represents, e.g., respective positions where the symbols designating the respective setup dialogs are to be displayed in the list display area R1; respective sizes of those symbols; and a format (or form) of a corresponding one of the setup dialogs DL2-DL4 to be displayed in the dialog display area R2. The PC 40 has a computer program, not shown, according to which the CPU 41 produces, based on the batches of setup-image constituting information received from the MF device 10, a plurality of batches of setup-image representing information that represent the setup dialogs or images DL2-DL4 per se, respectively.

Step S265 or Step S267 is followed by Step S270 where the CPU 41 carries out an image modifying operation. More specifically described, according to information inputted through the operation portion 53, the CPU 41 controls the display device 55 to change the manner of displaying of the list display area R1, change the setup dialogs displayed in the dialog display area R2, and/or change or update the setup information in the setup dialog currently displayed in the dialog display area R2.

Step S270 is followed by Step S280 where the CPU 41 judges whether an update command to update the current registered information DD has been inputted through the operation portion 53. If a negative judgment is made at Step S280, the control of the CPU 41 goes to Step S283 to judge whether an end command to end the current remote setup operation has been inputted through the operation portion 53. If a negative judgment is made at Step S283, the control of the CPU 41 goes back to Step S270 to repeat the image modifying operation till the update or end command is inputted.

On the other hand, if a positive judgment is made at Step S280, the control of the CPU 41 goes to Step S287 to transmits, to the MF device 10, an update command signal, and the updated or new registered information DD including the batches of setup information updated in the setup dialogs, so that the MF device 41 stores, in place of the current registered information DD, the new registered information DD in the EEPROM 17. Then, the control of the CPU 41 goes back to Step S270.

Meanwhile, if a positive judgment is made at Step S283, the control of the CPU 41 goes to Step S290 to transmit, to the MF device 10, a communication ending signal to end the current remote setup operation.

FIG. 9 is a flow chart representing a control program according to which the CPU 11 of the MF device 10 carries out a responding operation in which the CPU 11 transmits, in response to the signals received from the PC 40, the initial-image information, the current registered information DD, etc. to the PC 40.

In the responding operation, first, the CPU 11 judges, at Step S310, whether the MF device 10 has received, via the PC interface 21, the communication starting signal to start communication with the PC 40. If a negative judgment is made at Step S310, the CPU 11 waits till a positive judgment is made at Step S310. Meanwhile, if a positive judgment is made at Step S310, the control of the CPU 11 goes to Step S320 to establish the communication with the remote setup program Pr2 in use in the PC 40.

Step S320 is followed by Step S330 where the CPU 11 judges whether the MF device 10 has received the mode information from the PC 40 within an appropriate time period after a positive judgment is made at Step S310. If a positive judgment is made at Step S330, the control of the CPU 11 goes to Step S340 to identify of which sort the mode ID indicated by the mode information is. If the CPU 11 identifies, at Step S340, that the mode ID indicated by the mode information is the quick-dial mode ID, the control of the CPU 11 goes to Step S343 to produce initial-image information indicating the group ID designating the quick-dial setup information DAT4, and transmit the thus produced initial-image information to the PC 40, so that the displaying device 55 of the PC 40 can display, as the initial image, the quick-dial setup dialog or image DL2 in the dialog display area R2 of the device setting image WN2.

Alternatively, if the CPU 11 identifies, at Step S340, that the mode ID indicated by the mode information is the LAN mode ID, the control of the CPU 11 goes to Step S343 to produce initial-image information indicating the group ID designating the LAN setup information DAT2, and transmit the thus produced initial-image information to the PC 40, so that the display device 55 of the PC 40 can display, as the initial image, the LAN setup dialog or image DL3 in the dialog display area R2 of the device setting image WN2.

On the other hand, if a negative judgment is made at Step S330, the control of the CPU 11 goes to Step S350 to judge whether a station ID identifying the MF device 10 or the user had been registered in the MF device 10. More specifically described, the CPU 11 judges whether the station ID had been registered, by judging whether the EEPROM 17 stores, as part of the current registered information DD, information representing the station ID.

If a positive judgment is made at Step S350, the control of the CPU 11 goes to Step S353 to produce initial-image information indicating the default-image ID designating the default image DF as the initial image, and transmit the thus produced initial-image information to the PC 40, so that the display device 55 of the PC 40 can display, as the initial image, the default image DF in the right-hand (dialog display) area R2 of the device setting image WN2. On the other hand, if a negative judgment is made at Step S350, the control of the CPU 11 goes to Step S357 to produce initial-image information indicating the group ID designating the basic setup information DAT1, and transmit the thus produced initial-image information to the PC 40, so that the display device 55 of the PC 40 can display, as the initial image, the basic-information setup dialog or image DL4 in the dialog display area R2 of the device setting image WN2.

Step S343, Step S347, Step S353, or Step S357 is followed by Step S360 where the CPU 11 transmits, to the PC 40, the registered information DD currently stored in the EEPROM 17. Step S360 is followed by Step S370 to judge whether the MF device 10 has received, from the PC 40, the update command signal to command updating of the current registered information DD. If a positive judgment is made at Step S370, the control of the CPU 11 goes to Step S380 to receive, from the PC 40, the updated or new registered information DD transmitted with the update command signal, and substitute, with the new registered information DD, the current or old registered information DD stored in the EEPROM 17, so as to update the registered information DD. Then, the control of the CPU 11 goes back to Step S370.

On the other hand, if a negative judgment is made at Step S370, the control of the CPU 11 goes to Step S390 to judge whether the MF device 10 has received, from the PC 40, the communication ending signal to command ending of the communication with the PC 40. If a negative judgment is made at Step S390, the control of the CPU 11 goes back to Step S370. On the other hand, if a positive judgment is made at Step S390, the CPU 11 ends the current responding operation.

As is apparent from the foregoing description of the present device setting system 1, the CPU 41 of the PC 40 controls, at Step S110 in the remote setup starting operation in accordance with the application program Pr1, the display device 55 to display the menu image WN1 (FIG. 5) as the first mode-select image through which a user can select one of the two pre-selected setup-dialog (setup-image) display control modes each in accordance with the remote setup program Pr2. In addition, when the user selects, with the pointing device, one of the two pre-selected setup-dialog display control modes through the menu image WN1, the CPU 41 starts, at Step S145 or Step S165, the remote setup program Pr2 and, upon starting of the program Pr2, the CPU 41 inputs, to the program Pr2, the mode ID designating the thus selected pre-selected setup-dialog display control mode.

The display device 55 of the PC 40 can display, in the menu image WN1 as the first mode-select image, the device setting dialog DL1 (FIG. 5) including the two symbols SB2, SB3 corresponding to the two pre-selected setup-image display control modes each in accordance with the remote setup program Pr2. When the user selects one of the symbols SB2, SB3 through the device setting dialog DL1, the CPU 41 inputs, to the remote setup program Pr2, the mode ID designating the pre-selected setup-image display control mode corresponding to the selected symbol, and starts the program Pr2.

According to the remote setup program Pr2, the CPU 41 transmits, at Step S210 before Step S240 and the following steps, the communication starting command to the MF device 10, so as to inform the device 10 of the fact that those steps will be implemented. Then, at Steps S220 and 230, the CPU 41 judges whether a mode ID has been inputted to the remote setup program Pr2, and of which sort the inputted mode ID is, and thereby specifies a sort of an external cause to start the program Pr2. At Step S233 or Step S237, the CPU 41 selects one of the pre-selected setup-image display control modes that corresponds to the specified sort of external cause, and carries out the following operations corresponding to the selected setup-image display control mode.

More specifically described, when the remote setup program Pr2 is started, the CPU 41 judges, at Step S220, whether a mode ID has been inputted. If a positive judgment is made at Step S220, the CPU 41 carries out the following operations corresponding to the setup-image display control mode designated by the inputted mode ID. On the other hand, if a negative judgment is made at Step S220, the CPU 41 carries out the following operations corresponding to the default-image ID designating, as the initial image, the default image DF.

Thus, when the user selects the remote setup program Pr2 on the desktop image, or selects the symbol SB1 on the menu image WN1, the CPU 41 starts the remote setup program Pr2 while designating the above-indicated default-image ID. On the other hand, when the user selects the symbol SB2 on the menu image WN1, the CPU 41 starts the remote setup program Pr2 while designating the quick-dial mode ID; and when the user selects the symbol SB3 on the menu image WN1, the CPU 41 starts the remote setup program Pr2 while designating the LAN mode ID.

When the default (blank) image DF is displayed in the right-hand area R2 of the device setting image WN2, i.e., when the list of symbols is displayed in the left-hand area R1 of the image WN2, the CPU 41 implements Step S240 and the following steps, without transmitting mode information to the MF machine 10. And, at Step S265, the CPU 41 controls the display device 55 to display the device setting image WN2 including the list of symbols in the left-hand area R1 and including the default image DF in the right-hand (dialog display) area R2.

When the quick-dial setup dialog or image DL2 is to be displayed in the dialog display area R2 of the device setting image WN2, the CPU 41 transmits, at Step S233, the mode information indicating the quick-dial mode ID, to the MF machine 10, and subsequently implements Step S240 and the following steps. And, at Step S267, the CPU 41 controls the display device 55 to display the device setting image WN2 including, in place of the default image DF in the dialog display area R2 thereof, the quick-dial setup dialog or image DL2 used to set up one or more quick-dial numbers, i.e., the telephone directory. When the LAN setup dialog or image DL3 is to be displayed in the dialog display area R2 of the device setting image WN2, the CPU 41 transmits, at Step S237, the mode information indicating the LAN mode ID, to the MF machine 10, and subsequently implements Step S240 and the following steps. And, at Step S267, the CPU 41 controls the display device 55 to display the device setting image WN2 including, in the dialog display area R2 thereof, the LAN setup dialog or image DL2. Thus, the CPU 41 controls, at Step S265, the display device 55 to display the device setting image WN2 including the list of symbols R1 and the default image DF that cooperate with each other to constitute the second mode-select image; and the CPU 41 controls, at Step S267, the display device 55 to display the device setting image WN2 in different forms corresponding to the different pre-selected setup-image display control modes, i.e., the quick-dial mode and the LAN mode, that are pre-selected from all the setup-image display control modes designated by the symbols displayed in the left-hand area R1 of the device setting image WN2.

Thus, the present device setup system 1 enables the user to easily change the forms of the device setting image WN2, i.e., the sorts of dialogs displayed in the dialog display area R2 of the image WN2, by just selecting or clicking, with the pointing device, one of the symbols SB2, SB3 in the menu image WN1. That is, the user can easily call, with the least number of operations of the operation portion 53, a desired setup image, i.e., a desired one of the setup dialogs. In particular, the present system 1 enables the user to call, with the least number of operations, the frequently used quick-dial setup dialog DL2 used to set up the quick-dial (i.e., telephone-directory) function of the MF device 11. Thus, the present system 1 can set up, with improved operability, the functions of the MF device 10.

In addition, in the present embodiment, the PC 40 transmits the mode information representing the selected setup-image display control mode, to the MF device 10, and receives, from the MF device 10, the initial-image information designating the initial image corresponding to the display control mode. Thus, even in the case where the MF device 10 manages the initial-image information, the PC 40 can control the display device 55 to display the device setting image WN2 having the form (i.e., setup dialog) corresponding to the selected display control mode. Moreover, in the present embodiment, the PC 40 transmits, at Steps S220, S230, S233, S237, S240, the mode information to the MF device 10, only in the case where the remote setup program Pr2 is started in the other display control modes than the default-image display control mode. Thus, the amount of information communicated between the PC 40 and the MF device 10 can be reduced.

In addition, in the present embodiment, only in the case where the CPU 11 judges, at Step S330, that the MF device 10 has not received the mode information, the CPU 11 judges, at Step S350, whether a station ID identifying the MF device 10 had been set up as one of pre-selected setup items that are essentially needed when the MF device 10 transmits facsimile data. If a negative judgment is made, the MF device 11 transmits, to the PC 40, the initial-image information designating not the default image DF but the basic-information setup dialog DL4 including the setup item used to set the station ID. Thus, the PC 40 displays, in place of the default image DF, the basic-information setup dialog DL4 as a setup dialog used to set the station ID, in the dialog display area R2 of the device setting image WN2.

Thus, in the present device setup system 1, in the case where the remote setup program Pr2 is started with the default-image display control mode, priority is given to displaying the basic-information setup dialog DL4. Thus, the user can easily set up or input the batch of basic setup information in the MF device 10 and accordingly can easily use the facsimile function of the same 10.

In the present embodiment, Step S240 and some of the following steps of the remote setup program Pr2, and a portion of the PC 40 that includes the CPU 41 and implements those steps cooperate with each other to provide a display controller; and the application program Pr1, Steps S210, S220, S230, 233, 237, S260, S263, S265, S270 of the remote setup program Pr2, and a portion of the PC 40 that includes the CPU 41 and implements the program Pr1 and those steps of the program Pr2 cooperate with each other to provide a mode selector. In addition, Steps S220 and S230 of the remote setup program Pr2 and a portion of the PC 40 that includes the CPU 41 and implements those steps cooperate with each other to provide a first judger of the mode selector; and the application program Pr1 and a portion of the PC 40 that includes the CPU 41 and implements the program Pr1 cooperate with each other to provide a mode designator of the mode selector. Moreover, the menu image WN1 provides the first mode-select image, and the device setting image WN2 including the list of symbols in the left-hand area R1 thereof and the default image DF in the right-hand area R2 thereof provides the second mode-select image.

Furthermore, in the present embodiment, the information that is transmitted from the MF device 10 as the external electronic device to the PC 40 as the information processing apparatus and is needed for the display controller to operate in each one of the display control modes, comprises the initial-image information and the current registered information DD that are transmitted from the MF device 10 to the PC 40. At Step S210 of the remote setup program Pr2, the mode selector informs the MF device 11 of the fact that the display controller will start the remote setup operation. Step S330 of the responding program shown in FIG. 9 and a portion of the MF device 10 that includes the CPU 11 and implements that step cooperate with each other to provide a second judger of the electronic device 10; and Step S350 of the responding program and a portion of the MF device 10 that includes the CPU 11 and implements that step cooperate with each other to provide a third judger of the electronic device 10.

In short, in the present information processing apparatus 40, the display controller 41, S260, S263, S265 controls, in a mode-select-image display control mode, the display device 55 to display, in place of the setup image DL2-DL4, the mode-select image R1, DF used to select a setup-image display control mode, and the mode selector 41, 53, S110, S140, S145, S160, S165, S210, S220, S230, S233, S237, S260, S263, S265 includes the first judger S220, S230 which judges whether mode-select information as an external cause has been externally inputted to the mode selector so as to select a setup-image display control mode and, when the first judger judges that the mode-select information has been inputted, the mode selector causes the display controller 41, S240, S250, S267, S270 to control, in the selected setup-image display control mode, the display device to display the setup image and, when the first judger judges that the mode-select information has not been inputted, the mode selector causes the display controller to control, in the mode-select-image display control mode, the display device to display the mode-select image.

In the information processing apparatus 40, the display controller 41, S110, S265 selectively controls, in each one of a first mode-select-image display control mode and a second mode-select-image display control mode, the display device 55 to display a corresponding one of (a) a first mode-select image DL1 used by a user to select at least one pre-selected setup-image display control mode pre-selected from all the setup-image display control modes, and (b) the above-indicated mode-select image R1, DF as a second mode-select image used by the user to select one of all the setup-image display control modes, the mode selector 41, 53, S110, S140, S145, S160, S165, S210, S220, S230, S233, S237, S260, S263, S265 further comprises the mode designator S110, S140, S145, S160, S165 which operates the display controller to control, in the first mode-select-image display control mode, the display device to display the first mode-select image, and when the user has selected, through the first mode-select image, the at least one pre-selected setup-image display control mode, the mode designator inputs the mode-select information to the first judger S220, S230, and causes the display controller 41, S240, S250, S267, S270 to control, in the thus selected pre-selected setup-image display control mode, the display device to display a corresponding one of the setup images.

In the information processing apparatus 40, the mode designator S110, S140, S145, S160, S165 operates the display controller 41, S110 to control, in the first mode-select-image display control mode, the display device 55 to display the first mode-select image DL1 including the mode-select symbols SB2, SB3 designating the pre-selected setup-image display control modes, respectively, and when the user has selected one of the mode-select symbols through the first mode-select image, the mode designator inputs the mode-select information to the first judger S220, S230, and causes the display controller 41, S240, S250, S267, S270 to control, in the thus selected pre-selected setup-image display control mode, the display device to display a corresponding one of the setup images.

In the information processing apparatus 40, the electronic device 10 has the plurality of functions, and the setup images comprises at least one function setup image DL2, DL3 to set up at least one of the functions of the electronic device, and when the display controller 41, S240, S250, S267, S270 operates in the selected setup-image display control mode in place of the mode-select-image display control mode, the display controller controls the display device 55 to display the at least one function setup image in place of the mode-select image R1, DF.

In the information processing apparatus 40, the electronic device 10 has the telephone-directory function of storing the telephone-number-related information, and the at least one function setup image DL2, DL3 comprises the telephone-directory-function setup image DL2 used to input the telephone-number-related information to the apparatus 40, and when the display controller 41, S240, S250, S267, S270 operates in the selected setup-image display control mode in place of the mode-select-image display control mode, the display controller controls the display device 55 to display the telephone-directory-function setup image in place of the mode-select image R1, DF.

In the information processing apparatus 40, the mode selector 41, 53, S110, S140, S145, S160, S165, S210, S220, S230, S233, S237, S260, S263, S265 selects one of the setup-image display control modes, in the state in which the display controller 41, S240, S250, S267, S270 does not control, in any of the setup-image display control modes, the display device 55 to display any of the setup images.

In the information processing apparatus 40, the display controller 41, S110, S265 controls, in at least one mode-select-image display control mode, the display device 55 to display at least one mode-select image DL1, or R1 and DF, used to select one of the setup-image display control modes, and the mode selector 41, 53, S110, S140, S145, S160, S165, S210, S220, S230, S233, S237, S260, S263, S265 selects a setup-image display control mode, in the state in which the display controller controls, in the at least one mode-select-image display control mode, the display device to display the at least one mode-select image.

In the information processing apparatus 40, the at least one mode-select image comprises at least one of (a) the first mode-select image DL1 used to select at least one pre-selected setup-image display control mode pre-selected from all the setup-image display control modes, and (b) the second mode-select image R1, DF used to select one of all the setup-image display control modes, and the at least one mode-select-image display control mode comprises at least one of a first mode-select-image display control mode and a second mode-select-image display control mode that correspond to the first mode-select image and the second mode-select image, respectively.

In the information processing apparatus 40, the display controller 41, S110, S265 selectively controls, in each one of the first mode-select-image display control mode and the second mode-select-image display control mode, the display device 55 to selectively display a corresponding one of the first mode-select image DL1 and the second mode-select image R1, DF, and the display controller 41, S110 controls, in the first mode-select-image display control mode, the display device 55 to display the first mode-select image DL1 which is usable by a user to select, in place of the at least one pre-selected setup-image display control mode, the second mode-select-image display control mode so that the display controller displays the second mode-select image.

In the information processing apparatus 40, the display controller 41, S250 obtains, from the electronic device 10, the plurality of batches of setup-image-related information needed for the display controller to control the display device 55 to display the setup images DL2-DL4, respectively, and the mode selector 41, 53, S110, S140, S145, S160, S165, S210, S220, S230, S233, S237, S260, S263, S265 selects one of the setup-image display control modes, before the display controller obtains, from the external electronic device 10, the batches of setup-image-related information. Each batch of setup-image-related information may be either a batch of setup-image representing information that represents a corresponding one of the set-up images DL2-DL4 per se, or a batch of setup-image constituting information that is needed by the information processing apparatus 40 to produce the batch of setup-image representing information.

The information processing apparatus 40 comprises the input device 53 which is operable by a user to input, to the apparatus 40, the new batches of setup information DAT1 through DAT4.

The information processing apparatus 40 comprises the setup-information transmitter 41, S280, S287 which transmits the inputted new batches of setup information to the electronic device 10.

In the device setup system 1, the mode selector 41, S233, S237 of the information processing apparatus 40 transmits, to the electronic device 10, mode information indicating the selected setup-image display control mode and, when the electronic device S330, S340 receives the mode information from the mode selector, the electronic device S343, S347 transmits a batch of setup-image-related information needed for the display controller 41, S240, S250, S267, S270 to control, in the selected setup-image display control mode, the display device 55 to display the setup image.

In the device setup system 1, the display controller 41, S260, S263, S265 controls, in the second mode-select-image display control mode, the display device 55 to display the mode-select image R1, DF used to select a setup-image display control mode, the mode selector 41, S210, S233, S237 informs the electronic device 10 of a start of operation of the display controller and transmits, to the electronic device 10, the mode information indicating the selected setup-image display control mode, the electronic device comprises the second judger S330, S340 which judges, after the electronic device S310 has been informed of the start of operation of the display controller, whether the electronic device has received the mode information, and when the second judger judges that the electronic device has received the mode information, the electronic device S343, S347 transmits, to the mode selector, the batch of setup-image-related information needed for the display controller to control, in the selected setup-image display control mode, the display device to display the setup image and, when the second judger judges that the electronic device has not received the mode information, the electronic device S353 transmits, to the mode selector, a batch of mode-select-image-related information needed for the display controller to control, in the mode-select-image display control mode, the display device to display the mode-select image.

In the device setup system 1, the display controller 41, S240, S250, S267, S270 controls, in a pre-selected-item setup-image display control mode, the display device 55 to display the pre-selected-item setup image DL4 used to set up at least one pre-selected item of the electronic device 10, and the electronic device further comprises the third judger S350 which judges, when the second judger S330, S340 judges that the electronic device has not received the mode information, whether the at least one pre-selected item has not been set up. When the third judger judges that the at least one pre-selected item has not been set up, the electronic device S357 transmits, in place of the batch of mode-select-image-related information, a batch of pre-selected-item setup-image-related information needed for the display controller to operate, in the pre-selected-item setup-image display control mode, to control the display device to display the pre-selected-item setup image, and when the display controller receives, from the electronic device, the batch of pre-selected-item setup-image-related information, the display controller controls, in the pre-selected-item setup-image display control mode in place of the mode-select-image display control mode, the display device to display the pre-selected-item setup image in place of the mode-select image.

In the device setup system 1, the electronic device 10 comprises the memory 17 which stores the batches of setup information, and the updater S370, S380 which receives the inputted batches of setup information transmitted from the setup-information transmitter of the information processing apparatus 40, and stores the received batches of setup information, in the memory 17, so as to update the batches of setup information stored by the memory 17.

In the device setup system 1, the computer program Pr1, Pr2 is readable by the computer to function as each of the display controller S240, S250, S267, S270 and the mode selector 41, 53, S110, S140, S145, S160, S165, S210, S220, S230, S233, S237, S260, S263, S265 of the information processing apparatus 40. The control program can be provided as a computer-readable computer program product, such as a computer-readable recording medium on which the computer program is recorded, or it may be a transmittable carrier wave in which the control program is embodied as a data signal. The control program can be transmitted by a carrier wave over a communications network such as the World Wide Web and/or transmitted in a wireless fashion, for example, by radio waves or by infrared waves. The control program can also be transmitted from a remote storage facility to a local control unit. In such an arrangement, the local control unit interacts with the remote storage facility to transfer all or part of the control program, as needed, for execution by the local unit. Accordingly, the local unit does not require a large amount of memory capacity. The computer-readable recording medium can be, e.g., a CD-ROM, a computer hard drive, a RAM, or other types of memories that are readily removable from, or intended to remain fixed within, the computer.

While the present invention has been described in its preferred embodiment, the present invention may be otherwise embodied.

For example, in the illustrated embodiment, the present invention is applied to the device setup system 1 wherein the device setup image WN2 including the list display area R1 for displaying the tree-like list of symbols designating the respective setup dialogs, and additionally including the dialog display area R2, is displayed, and a setup dialog initially displayed in the dialog display area R2 is selected from the different setup dialogs, according to the sort of each external cause. However, the principle of the present invention is applicable to such a device setup system wherein a device setting image including a list display area for displaying a list of tabs designating respective tab sheets, and additionally including a tab-sheet display area, is displayed, and a tab sheet initially displayed in the tab-sheet display area is selected from the tab sheets, according to the sort of each external cause.

It is to be understood that the present invention may be embodied with various changes, modifications, and improvements that may occur to a person skilled in the art without departing from the spirit and scope of the invention defined in the appended claims.

What is claimed is:

1. An information processing apparatus for being connected to an external electronic device to communicate with, and set up the external electronic device, the apparatus comprising:

a display device including a screen;

a display controller which selectively controls, in each one of a plurality of setup-image display control modes, the display device to selectively display, on the screen thereof, a corresponding one of a plurality of setup images respectively used to input, to the apparatus, a plurality of batches of setup information to set up the external electronic device;

a first input portion which receives any one of a plurality of mode-selection commands inputted by a user;

a mode selector which selects, when the first input portion receives said one mode-selection command, a corresponding one of the setup-image display control modes, and causes the display controller to control, in the selected setup-image display control mode, the display device to display a corresponding one of the setup images that is used by the user to input a corresponding one batch of setup information of the plurality of batches of setup information;

a second input portion which receives said one batch of setup information inputted by the user; and a setup-information transmitter which transmits the inputted batch of setup information to the external electronic device so as to set up the external electronic device.

2. The information processing apparatus according to claim 1, wherein the display controller controls, in a mode-select-image display control mode, the display device to display, in place of said one setup image, a mode-select image used to select said one setup-image display control mode, and wherein the mode selector comprises a first judger which judges whether mode-select information as said one mode-selection command has been externally inputted by the user to the first input portion so as to select said one setup-image display control mode and, when the first judger judges that the mode-select information has been inputted, the mode selector causes the display controller to control, in the selected setup-image display control mode, the display device to display said one setup image and, when the first judger judges that the mode-select information has not been inputted, the mode selector causes the display controller to control, in the mode select-image display control mode, the display device to display the mode-select image.

3. The information processing apparatus according to claim 2, wherein the display controller selectively controls, in each one of a first mode-select-image display control mode and a second mode-select-image display control mode, the display device to display a corresponding one of (a) a first mode-select image used by the user to select, as said one setup image display control mode, at least one pre-selected setup-image display control mode pre-selected from all the setup-image display control modes, and (b) said mode-select image as a second mode-select image used by the user to select said one of all the setup-image display control modes, wherein the mode selector further comprises a mode designator which operates the display controller to control, in the first mode-select-image display control mode, the display device to display the first mode-select image, and wherein when the user has selected, through the first mode-select image, said at least one pre-selected setup-image display control mode, the mode designator inputs the mode-select information to the first judger, and causes the display controller to control, in the thus selected pre-selected setup-image display control mode, the display device to display a corresponding one of the setup images.

4. The information processing apparatus according to claim 3, wherein the mode designator operates the display controller to control, in the first mode-select-image display control mode, the display device to display the first mode-select image including a plurality of mode-select symbols designating a plurality of said pre-selected setup-image display control modes, respectively, and wherein when the user has selected one of the mode-select symbols through the first mode-select image, the mode designator inputs the mode-select information to the first judger, and causes the display controller to control, in the thus selected pre-selected setup-image display control mode, the display device to display a corresponding one of the setup images.

5. The information processing apparatus according to claim 2, wherein the external electronic device has a plurality of functions, and the setup images comprise at least one function setup image to set up at least one of the functions of the external electronic device, and wherein when the display controller operates in the selected setup-image display control mode in place of the mode-select-image display control mode, the display controller controls the display device to display, as said one setup image, said at least one function setup image in place of the mode-select image.

6. The information processing apparatus according to claim 5, wherein the external electronic device has, as one of the functions, a telephone-directory function of storing telephone-number-related information, and said at least one function setup image comprises a telephone-directory-function setup image used to input the telephone-number-related information to the second input portion, and wherein when the display controller operates in the selected setup-image display control mode in place of the mode-select-image display control mode, the display controller controls the display device to display, as said at least one function setup image, the telephone-directory-function setup image in place of the mode-select image.

7. A computer-readable medium having computer readable instructions stored thereon, said computer readable instructions containing a computer program which is readably by a computer to function as each of the display controller, the mode selector, and the mode designator of the information processing apparatus according to claim 3.

8. The information processing apparatus according to claim 1, wherein the mode selector selects said one of the setup-image display control modes, in a state in which the display controller does not control, in any of the setup-image display control modes, the display device to display any of the setup images.

9. The information processing apparatus according to claim 8, wherein the display controller controls, in at least one mode-select-image display control mode, the display device to display at least one mode-select image used to select said one of the setup-image display control modes, and wherein the mode selector selects said one setup-image display control mode, in a state in which the display controller controls, in said at least one mode-select-image display control mode, the display device to display said at least one mode-select image.

10. The information processing apparatus according to claim 9, wherein said at least one mode-select image comprises at least one of (a) a first mode-select image used to select, as said one of the setup-image display control modes, at least one pre-selected setup-image display control mode pre-selected from all the setup-image display control modes, and (b) a second mode-select image used to select said one of all the setup-image display control modes, and wherein said at least one mode-select-image display control mode comprises at least one of a first mode-select-image display control mode and a second mode-select-image display control mode that correspond to the first mode-select image and the second mode-select image, respectively.

11. The information processing apparatus according to claim 10, wherein the display controller selectively controls, in each one of the first mode-select-image display control mode and the second mode-select-image display control mode, the display device to selectively display a corresponding one of the first mode-select image and the second mode-select image, and wherein the display controller controls, in the first mode-select-image display control mode, the display device to display the first mode-select image which is usable by the user to select, in place of said at least one pre-selected setup-image display control mode, the second mode-select-image display control mode so that the display device displays the second mode-select image.

12. The information processing apparatus according to claim 1, wherein the display controller obtains, from the external electronic device, a plurality of batches of setup-image related information needed for the display controller to control the display device to display the setup images, respectively, and wherein the mode selector selects said one of the setup-image display control modes, before the display controller obtains, from the external electronic device, the batches of setup-image-related information.

13. A device setup system, comprising:
the information processing apparatus according to claim 1; and
an external electronic device to which the information processing apparatus is connected to communicate with, and thereby set up, the external electronic device.

14. The device setup system according to claim 13, wherein the mode selector of the information processing apparatus transmits, to the external electronic device, mode information indicating the selected setup-image display control mode and, when the external electronic device receives the mode information from the mode selector, the external electronic device transmits a batch of setup-image-related information needed for the display controller to control, in the selected setup-image display control mode, the display device to display said one setup image.

15. The device setup system according to claim 14, wherein the display controller controls, in a mode-select-image display control mode, the display device to display a mode-select image used to select said one setup-image display control mode, wherein the mode selector informs the external electronic device of a start of operation of the display controller and transmits, to the external electronic device, the mode information indicating the selected setup-image display control mode, wherein the external electronic device comprises a second judger which judges, after the external electronic device has been informed of the start of operation of the display controller, whether the external electronic device has received the mode information, and wherein when the second judger judges that the external device has received the mode information, the external electronic device transmits, to the mode selector, the batch of setup-image-related information needed for the display controller to control, in the selected setup-image display control mode, the display device to display said one setup image and, when the second judger judges that the external electronic device has not received the mode information, the external device transmits, to the mode selector, a batch of mode-select-image-related information needed for the display controller to control, in the mode-select image display control mode, the display device to display the mode-select image.

16. The device setup system according to claim 15, wherein the display controller controls, in a pre-selected-item setup-image display control mode, the display device to display a pre-selected-item setup image used to set up at least one pre-selected item of the electronic device, wherein the external electronic device further comprises a third judger which judges, when the second judger judges that the external electronic device has not received the mode information, whether said at least one preselected item has not been set up, wherein when the third judger judges that said at least one preselected item has not been set up, the external electronic device transmits, in place of the batch of mode-select-image-related information, a batch of preselected-item setup-image-related information needed for the display controller to operate, in the pre-selected-item setup-image display control mode, to control the display device to display the pre-selected-item setup image, and wherein when the display controller receives, from the external electronic device, the batch of pre-selected-item setup-image-related information, the display controller controls, in the pre-selected-item setup-image display control mode in place of the mode-select-image display control mode, the display device to display the pre-selected-item setup image in place of the mode-select image.

17. The device setup system according to claim 16, wherein the external electronic device comprises a digital multifunction device having at least a facsimile function, and wherein the third judger judges, when the second judger judges that the digital multifunction device has not received the mode information, whether said at least one preselected item that is essentially needed for the digital multifunction device to operate the facsimile function has not been set up.

18. The device setup system according to claim 13, wherein the external electronic device comprises:
 a memory which stores the batches of setup information; and
 an updater which receives the inputted batches of setup information transmitted from the setup-information transmitter of the information processing apparatus, and stores the received batches of setup information, in the memory, so as to update the batches of setup information stored by the memory.

19. A computer-readable medium having computer-readable instructions stored thereon, said computer readable instructions containing a computer program which is readable by a computer to function as each of the display controller and the mode selector of the information processing apparatus according to claim 1.

20. The information processing apparatus according to claim 1, wherein each of the first input portion and the second input portion comprises at least one of a keyboard and a pointing device.

* * * * *